United States Patent [19]

Buter et al.

[11] Patent Number: 4,851,294

[45] Date of Patent: Jul. 25, 1989

[54] THIXOTROPIC COATING COMPOSITION, PROCESS FOR COATING A SUBSTRATE WITH SUCH COATING COMPOSITION AND THE COATED SUBSTRATE THUS OBTAINED

[75] Inventors: Roelof Buter, Dieren; Andreas H. J. Roelofs, HV Arnhem, both of Netherlands

[73] Assignee: Akzo N.V., Netherlands

[21] Appl. No.: 830,435

[22] Filed: Feb. 18, 1986

[30] Foreign Application Priority Data

Feb. 20, 1985 [NL] Netherlands ............... 8500476

[51] Int. Cl.$^4$ .............................................. C08L 75/12
[52] U.S. Cl. ..................... 428/425.8; 427/386; 427/388.5; 427/393; 525/123; 525/125; 525/128; 525/130; 525/185; 525/455
[58] Field of Search ............................ 528/68, 76, 44; 523/456, 463; 525/123, 128, 130, 125, 185, 455; 524/211, 212, 216; 427/393, 386, 388.5; 428/425.8

[56] References Cited

U.S. PATENT DOCUMENTS

| | | | |
|---|---|---|---|
| 3,236,895 | 2/1966 | Lee et al. | 528/68 |
| 3,359,243 | 12/1967 | Criner | 528/68 |
| 3,385,829 | 5/1968 | Heydkamp et al. | 528/68 |
| 3,436,359 | 4/1969 | Hubin et al. | 528/68 |
| 3,808,250 | 4/1974 | Blahak et al. | 528/68 |
| 4,002,598 | 1/1977 | Waddill et al. | 528/68 |
| 4,064,107 | 12/1977 | Stackman et al. | 528/68 |
| 4,086,207 | 4/1978 | Cassandrini et al. | 528/68 |
| 4,311,622 | 1/1982 | Buter | 525/128 |
| 4,314,924 | 2/1982 | Haubennestel et al. | 524/211 |

*Primary Examiner*—Veronica P. Hoke
*Attorney, Agent, or Firm*—Louis A. Morris

[57] ABSTRACT

The invention provides for a thixotropic coating composition comprising (1) a binder and (2) a sag control agent which is the reaction product of (a) a symmetrical aliphatic or homocyclic diisocyanate and (b) a monoamine or diamine having at least one primary amino group and ether group, the coating composition containing 0.1 to 30 percent by weight of the sag control agent. The invention also relates to a process for coating a substrate using said coating composition and to the coated substrate thus obtained.

6 Claims, No Drawings

THIXOTROPIC COATING COMPOSITION, PROCESS FOR COATING A SUBSTRATE WITH SUCH COATING COMPOSITION AND THE COATED SUBSTRATE THUS OBTAINED

BACKGROUND OF THE INVENTION

The invention relates to a thixotropic coating composition based on a binder and a diurea compound as sag control agent.

A coating composition of the type indicated above is described in, among other places, Belgian Patent Specifications Nos. 808,465 and 808,466, which disclose the use of a reaction product of a monoisocyanate or diisocyanate and a primary or a secondary polyamine as sag control agent. British Patent Specification No. 1,586,508 describes the use of a reaction product of a diisocyanate and a monoamine or hydroxymonoamine containing 1-5 aliphatic carbon atoms. A disadvantage to the use of the above sag control agents is that the flow of the coating composition is not quite satisfactory, particularly when use is made of a relatively low curing temperature. As a result, a so-called orange-peel appearance is obtained. Moreover, those sag control agents are generally more suitable for use in coating compositions based on an organic solvent than in those based on water.

SUMMARY OF THE INVENTION

In one aspect, the invention is a coating composition having (1) a binder, and (2) a sag control agent which is the reaction product of (a) a diisocyanate and (b) an ether amine.

In another aspect, the invention is a method of coating a substrate with such a composition.

In yet another aspect, the invention is substrate coated with such a composition.

An object of the present invention is to provide a universally applicable sag control agent with the use of which a coating composition is obtained which is satisfactorily thixotropic at any curing temperature, for instance at ambient temperature or at a temperature in the range of 60° to 260° C., without the use of the novel sag control agent detracting from the flow.

DETAILED DESCRIPTION OF THE INVENTION

Unless otherwise specified, the numerical ranges in the specification and claims are not critical. That is, they may be read as if prefaced by the word "about" or "substantially".

The coating composition according to the invention is characterized in that the sag control is the reaction product of a symmetrical aliphatic or homocyclic diisocyanate and a monoamine or diamine containing at least a primary amino group and an ether group, the sag control agent consisting of solid particles and the coating composition containing 0.1 to 30 percent by weight of the sag control agent. For brevity, the amine will hereinafter be referred to as ether amine.

The binder that can be thixotropized according to the invention may as a rule be any arbitrarily chosen binder. As suitable examples may be mentioned: ester diols; polyesters; polyurethanes; alkyd resins, which may be modified or not with oil; acrylate resins or methacrylate resins; epoxy resins modified or not with oil; copolymers or a (meth)acrylate monomer, styrene and/or vinyl chloride; unsaturated polyester resins which may optionally be mixed with styrene and/or one or more other monomeric compounds, for instance a (meth)acrylate monomer or an allyl compound; water-dilutable alkyd resins; water-dilutable polyesters or ester diols; water-dilutable polyurethanes; water-dilutable acrylate resins; drying or non-drying oils, stand oil and other synthetic or natural resins.

Optionally, the coating composition may also contain a curing agent for the binder. When the binder contains hydroxyl groups, the usual curing agents are for example: N-methylol groups and/or N-methylol ether groups-containing amino resins obtained by reacting an aldehyde, such as formaldehyde, with a compound containing amino groups or amido groups, such as melamine, urea, N,N'-ethylene diurea, dicyandiamide and benzoguanamine; for the preparation of such compounds see Houben-Weyl, Methoden der organischen Chemie, Band 14/2, pp. 319–371 (1963). It is preferred that the afore-described compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the alcohols referred to above. Particularly, use is made of a methylol melamine containing 4 to 6 methylol groups per molecule of melamine, at least 3 methylol groups being etherified with methanol, ethanol, a propanol or a butanol, or a butanol-etherified condensation product of formaldehyde and N,N'-ethylene diurea. More particularly, use is made of a hexaalkoxymethyl melamine whose alkoxy group contains 1 to 4 carbon atoms. Instead of or besides the above-described curing agents other suitable agents may be used, such as blocked or non-blocked isocyanurate compounds or blocked or non-blocked aliphatic, cycloaliphatic, heterocyclic or aromatic di-, tri- or polyvalent isocyanates. As examples of suitable isocyanates may be mentioned hexamethylene diisocyanate, 2,2,4-trimethylhexane-1,6-diisocyanate, 2,4,4-trimethyl-1,6-diisocyanate, cyclohexyl-1,4-diisocyanate, isophoron diisocyanate, the adduct of 1 molecule of 1,4-butanediol and 2 molecules of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, the adduct of 3 molecules of hexamethylene diisocyanate and 1 molecule of water, the adduct of 1 molecule of trimethylol propane and 3 molecules of isophoron diisocyanate, the adduct of 1 molecule of trimethylol propane and 3 molecules of toluene diisocyanate and the adduct of 1 molecule of pentaerythritol and 4 molecules of hexamethylene diisocyanate. The isocyanate or isocyanurate compound may optionally be blocked with any usual or suitable blocking agent. When use is made of a hydroxyl groups-containing binder, the curing agent is contained in the coating composition in an amount such that the molar ratio of the reactive groups of the curing agent to those of the hydroxyl groups-containing polymer is between 0.6 and 1.5 and preferably between 0.7 and 1.3.

According to the invention the symmetrical diisocyanate to be used for the preparation of the sag control agent is aliphatic or homocyclic, i.e. cycloaliphatic, araliphatic or aromatic, but not of a heterocyclic nature. As examples of suitable diisocyanates may be mentioned trimethylene diisocyanate, tetramethylene diisocyanate, hexamethylene diisocyanate, ω,ω'-dipropylether diisocyanate, thiodipropyl diisocyanate, cyclohexyl-1,4- diisocyanate, dicyclohexylmethane-4,4'-diisocyanate, 1,5-dimethyl-2,4-bis(isocyanatomethyl)benzene, 1,5-dimethyl-2,4 bis(ω-isocyanatoethyl)-benzene, 1,3,5-trimethyl-2,4-bis(isocyanatomethyl)benzene, 1,3,5-triethyl-2,4-bis(isocyanatomethyl)benzene, dicyclohexyldimethylmethane-4,4'-diisocyanate, 2,4-toluene diisocyanate, 2,6-toluene diisocyanate and diphenylmethane-4,4'-diisocyanate. The diisocyanate generally contains 5–24, preferably 6–18, carbon atoms. It is preferred that use should be made of an aliphatic or homocyclic diisocyanate containing 6–9 carbon atoms, such as cyclohexyl-1,4-diisocyanate, toluene diisocyanate and hexamethylene diisocyanate. Optionally, use may be made of mixtures of these compounds.

As examples of representative ether amines, the second component from which the sag control agent according to the invention is built up, may be mentioned: (cyclo)alkoxy(cyclo)alkyl monoamines, mono(cyclo)alkoxy arene amines, poly(cyclo)alkoxy arene amines, areneoxy(cyclo)alkoxy amines, aryloxy(cyclo)alkyl amines, areneoxyarene amines, aryloxyaryl amines. The starting ether amines may optionally contain one or more hydroxyl groups. The ether amines generally contain not more than 55 carbon atoms, preferably 1–24 and more particularly 1–12 carbon atoms. As examples of suitable ether amines may be mentioned 2-methoxyethylamine, 2-ethoxyethylamine, 3-methoxy-1-propylamine, 1-methoxymethylpropylamine, 1,1-dimethoxy-2 propylamine, 3-ethoxy-1-propylamine, 3-butoxy-1-propylamine, 3-(2-ethylhexyloxy)-1-propylamine, 3-tridecyloxypropylamine, 3-stearyloxypropylamine, p-methoxybenzylamine, 3,4-dimethoxybenzylamine, p-methoxyphenylethylamine, 3,4-dimethoxyphenylethylamine, 9-phenoxy-4,7-dioxanon-1-amine, 2-methyl-4-methoxyaniline, 2,5-dimethoxy-aniline, furfurylamine, tetrahydrofurfurylamine, 2-(4-morpholinyl)ethylamine, 4-(3-aminopropyl)morpholine, 2,2'-aminoethoxyethanol, 4,7-dioxadecane-1,10-diamine, 4,9-dioxadecane-1,12-diamine, 7-methyl-4,10-dioxatridecane-1,13-diamine, 4,7,10-trioxatridecane-1,13-diamine and bis(3-aminopropyl)polytetrahydrofuran having a molecular weight of about 750. It is preferred that as ether amine furfurylamine or tetrahydrofurfurylamine should be used. Mixtures of the ether amines referred to above are also applicable.

In the reaction between the diisocyanate and the ether amine generally either the diisocyanate or the ether amine may be used in excess relative to the stoichiometric amount. For example, the ratio of the number of amino groups of the ether amine to the number of isocyanate groups of the diisocyanate may be between 0.7 and 0.5, and preferably between 0.9 and 1.1.

The reaction between the diisocyanate and the ether amine may generally be carried out in any arbitrarily chosen way by combining the reaction components, optionally at elevated temperature. It is preferred that the reaction should be carried out at a temperature in the range of 10° to 150° C., more particularly in the range of 20° to 80° C. Although in general the reaction components may be combined in any arbitrarily chosen manner, it is as a rule preferred that the diisocyanate should be added to the ether amine, which may be done in several steps, if desired. Generally, the reaction is carried out in the presence of a solvent, for instance acetone, methyl isobutyl ketone, 1-methoxypropanol-2, benzene, toluene, xylene, or aliphatic hydrocarbons such as petroleum ether.

The preparation of the sag control agent may optionally also be carried out in the presence of a binder, a curing agent (if any!) and/or some starting compound for the binder or the curing agent. It is preferred then that the diisocyanate should be mixed with a mixture of the ether amine and the binder and/or the curing agent for it. The mixing operation may be carried out in any convenient manner, with the reactants being vigorously stirred. The binder, the diisocyanate and the ether amine are mixed in amounts such that upon conclusion of the reaction there is obtained a mixture that may optionally be used as master batch of the sag control agent, consisting of 0.1–30 by weight, preferably 1–10% by weight, of the sag control agent and 70–99,9% weight, preferably 90–99% by weight of the binder and/or curing agent. Said weight ratios generally result in obtaining a viscous mixture which can very readily be homogeneously mixed with the binder to be employed in the preparation of the thixotropic coating composition or with the optionally employed curing agent. The binders and/or optional curing agents in the thixotropic coating composition and in the master batch may be of the same or of different composition. Particularly, if only small amounts of the master batch need be added to the coating composition, the respective binders and/or curing agents differ. In this "in situ" preparation the reaction is preferably carried out in an atmosphere of inert gas at a temperature in the range of 20° to 80° C., in which case first the ether amine is added to the binder and, after the mixture has been homogenized, the diisocyanate is added to the mixture, with stirring. If the sag control agent is not prepared in situ in the binder, the two components of the thixotropic coating composition can be mixed by melting and mixing the sag control agent at a temperature in the range of 80° to 200° C. in the presence of the binder, as a result of which a homogeneous mixture is obtained. After the mixture has been cooled to room temperature, the sag control agent forms a dispersion in the binder and the resulting thixotropic coating composition may have an opaque, an opalescent or even a transparent appearance, depending on the size and the refractive index of the dispersed particles of the sag control agent.

The degree to which the coating composition is thixotropic, of course, depends on the proportion of sag control agent and the nature of the sag control agent and the binder. As a rule, the desired degree of thixotropy may be obtained by employing the sag control agent in an amount of 0.1 to 30, and preferably 1 to 10 percent by weight, based on the total amount of coating composition.

The action of the sag control agent according to the invention is not or hardly affected by water and/or an organic solvent contained in the thixotropic coating composition, so that the present sag control agent is universally applicable and may advantageously be used both in aqueous coating compositions and in compositions that mainly contain organic solvent as dispersing agent. Nor is the thixotropy affected at elevated temperature, so that the sag control agent according to the invention is very suitable for use in baking paints, which are usually cured at a temperature in the range of 60° to 260° C.

The sag control agent in the coating composition according to the invention generally has a particle size of 0.01–50 μm, preferably 0.1–20 μm. The particle size is determined with the aid of a Hegman fineness-of-grind gauge.

The sag control agents according to the invention are particularly suitable for use in coating compositions having a high solids content, because they hardly or not at all increase the viscosity of the coating composition under processing conditions, so that no solvent or only a very small amount thereof is needed to bring the coating composition in an applicable state. By a coating composition having a high solids content is to be understood here a composition having a solids content of at least 60 percent by weight. The solids content is determined in accordance with ASTM Method D 1644-59 with heating for 1 hour at 105° C.

The sag control agent according to the invention further has the considerable advantage that it does not or hardly decrease the gloss of the composition. This is in sharp contrast to the effect produced by other sag control agents such as Aerosil (registered trademark) and other silicates.

Depending on the binder employed, any conventional compound can be used as curing agent. The coating composition may further contain usual adjuvants and additives, for instance pigment dispersants, colourants, metallic or non-metallic pigments, solvents and accelerators for the curing reaction, for instance acidic compounds such as p-toluene sulphonic acid or blocked products thereof.

The thixotropic coating compositions may be applied to a substrate in any desirable manner, for instance by roller coating, spraying, brushing, sprinkling, flow coating, dipping or electrostatic spraying.

Suitable substrates are those of wood, synthetic materials and pretreated or non-pretreated metals. The thixotropic coating composition may further be cured or baked in the usual way, for instance at ambient temperature or in an oven at the usual temperatures, for instance in the range of 60° to 260° C., over a period of 1 to 120 minutes.

The invention will be further described in the following unlimitative examples. The viscosity values given in the examples were measured at 20° C. with the aid of a Ford cup No. 4 and are expressed in seconds' efflux time.

The polyester A is built up from phthalic anhydride, 2,2-dimethyl-1,3-propane diol and trimethylol propane, and has an acid number of 25 and a molecular weight of 3000; the polyester is neutralized with dimethylethanolamine. The thickness of a coating is determined on a coating in its cured state. By "parts" is to be understood here "parts by weight" and by "%" "percentage by weight", unless otherwise indicated.

EXAMPLE 1

(a) Preparation of a clear, water-dilutable baking paint having a high solids content.

The following components were homogeneously mixed:

| | |
|---|---|
| di(neopentylglycol)adipate | 700 g |
| hexamethoxymethyl melamine | 300 g |
| propylene glycol monomethyl ether | 77 g |
| water | 154 g |
| 20% -solution in isopropanol of p-toluene sulphonic acid, neutralized with diethanolamine | 25 g |

The sprayable composition had a viscosity of about 0.1 Pa.s (30 seconds' efflux time).

(b) Preparation of a thixotropic, clear, water-dilutable baking paint having a high solids content.

The following components were homogeneously mixed:

| | |
|---|---|
| di(neopentyl glycol)adipate | 700 g |
| 3-ethoxy-1-propylamine | 22.2 g |

Over a period of 30 minutes 17.8 grammes of molten cyclohexyl-1,4-diisocyanate were added to this mixture, with stirring and under an atmosphere of nitrogen, the temperature of the reaction mixture rising to 60° C., after which stirring was continued for 30 minutes.

Subsequently, there were successively added:

| | |
|---|---|
| hexamethoxymethyl melamine | 300 g |
| propylene glycol monomethylether | 109 g |
| water | 219 g |
| 20% solution in isopropanol of paratoluene sulphonic acid, neutralized with diethanolamine | 25 g |

After each addition the resulting mixture was homogenized. The sprayable composition had a viscosity of about 0.1 Pa.s (30 seconds' efflux time).

The two baking paints (a) and (b) were applied to steel panels (Bonder 132) and in a variable coating thickness in the wet state of 0 μm to 150 μm, after which they were cured in an oven for 30 minutes at 150° C. while placed in a vertical position. The baking paint (a) already displayed sagging at a coating thickness of the cured film of 20 μm, the greatest coating thickness being 25 μm. The baking paint (b), however, only started showing sagging at a coating thickness of 55 μm, the greatest coating thickness being 80 μm.

EXAMPLE 2

The procedure of Example 1 was repeated, except that use was made of 24.9 g of p-methoxybenzylamine instead of 22.2 g of 3-ethoxy-1-propylamine and 15.1 g instead of 17.8 g of cyclohexyl-1,4-diisocyanate. The sprayable composition had a viscosity of about 0.1 Pa.s (30 seconds' efflux time). The composition obtained in this example was applied and tested in the way indicated in Example 1. The baking paint only started showing sagging with a coating as thick as 55 μm, the greatest coating thickness being 80 μm.

EXAMPLE 3

(a) Preparation of a pigment dispersion

A pigment dispersion was prepared by milling the following components in a Red-Devil shaking machine (Red-Devil is a registered trade mark) and subsequently filtering them off:

| | |
|---|---|
| titanium dioxide | 515 g |
| pigment dispersing agent (a water-dilutable polyester of a high molecular weight) | 30 g |
| hexamethoxymethyl melamine | 270 g |
| propylene glycol monomethyl ether | 70 g |

The sprayable composition had a viscosity of about 0.1 Pa.s (30 seconds' efflux time).

(b) Preparation of a thixotropic resin

The following components were homogeneously mixed:

| | |
|---|---|
| di(neopentyl glycol) adipate | 720 g |
| hexamethoxymethyl melamine | 173 g |
| propylene glycol monomethyl ether | 43 g |
| furfurylamine | 13.8 g |

Over a period of 30 minutes there were added to this mixture, with stirring and under an atmosphere of nitrogen, 12.4 g of a mixture of 2,4-toluene diisocyanate and 2,6-toluene diisocyanate (in a weight ratio of 80:20), with the temperature of the reaction mixture rising to 35° C., following by stirring for 30 more minutes.

(c) Preparation of a sprayable pigmented thixotropic baking paint having a high solids content A pigmented baking paint was obtained by homogeneously mixing the following components:

| | |
|---|---|
| pigment dispersion (prepared as indicated under a) | 442.5 g |
| thixotropic resin (prepared as indicated under b) | 963.2 g |
| water | 400 g |
| 20%-solution in isopropanol of p-toluene sulphonic acid, neutralized with diethanolamine | 25 g |

The sprayable composition had a viscosity of about 0.1 Pa.s (30 seconds' efflux time).

(d) In a comparative experiment the following mixture was used:

| | |
|---|---|
| pigment dispersion (prepared as indicated under a) | 442.5 g |
| di(neopentyl glycol)adipate | 720 g |
| hexamethoxymethyl melamine | 173 g |
| propylene glycol monomethyl ether | 43 g |
| water | 300 g |
| 20%-solution of p-toluene sulphonic acid in isopropanol, neutralized with diethanolamine | 25 g |

The sprayable composition had a viscosity of 0.1 Pa.s (30 seconds' efflux time). The compositions obtained by this example were applied and tested in the way indicated in Example 1.

Contrary to the non-thixotropic composition 3d the wet film of the thixotropic composition 3c did not show any tendency to run off a steel panel (Bonder 132). After the panels had been baked for 30 minutes at 150° C. while kept in a vertical position, the thixotropic paint 3c was found to have the same coating thickness at the top and the bottom of the panel, whereas in the case of the non-thixotropic control paint 3d the thickness at the top was found to be 30 μm and at the bottom 50 μm.

EXAMPLE 4

(a) Preparation in an organic solvent of a clear baking paint having a high solids content The following components were homogeneously mixed:

| | |
|---|---|
| di(neopentyl glycol)adipate | 700 g |
| hexamethoxymethyl melamine | 300 g |
| o-xylene | 251 g |
| 20%-solution in isopropanol of paratoluene sulphonic acid, neutralized with diethanolamine | 25 g |

The sprayable composition had a viscosity of about 0.1 Pa.s (30 seconds efflux time).

(b) Preparation in an organic solvent of a thixotropic, clear baking paint having a high solids content The following components were homogeneously mixed:

| | |
|---|---|
| di(neopentyl glycol)adipate | 700 g |
| o-xylene | 419 g |
| furfurylamine | 10.7 g |

Over a period of 30 minutes, 9,3 grammes of hexamethylene diisocyanate were added, with stirring and under an atmosphere of nitrogen, the temperature of the reaction mixture rising from 25° to 33° C., after which stirring was continued for another 30 minutes. Subsequently, 300 g of hexamethoxymethyl melamine were added. The sprayable composition had a viscosity of about 0.1 Pa.s (30 seconds' efflux time). The two baking paints were applied and tested as indicated in Example 1. The baking paint 4a already showed sagging at a coating thickness of 15 μm, the greatest thickness being 25 μm. The baking paint 4b only started showing sagging at 45 μm, the greatest coating thickness being 50 μm.

EXAMPLE 5

(a) Preparation of a clear, water-dilutable baking paint having a high solids content The following components were homogeneously mixed:

| | |
|---|---|
| di(neopentyl glycol)adipate | 700 g |
| hexamethoxymethyl melamine | 300 g |
| propylene glycol monomethyl ether | 77 g |
| water | 154 g |
| 20%-solution in isopropanol of paratoluene sulphonic acid, neutralized with diethanolamine | 25 g | b) Preparation of a clear, water-dilutable thixotropic baking paint having a high solids content The following components were homogeneously mixed:

| | |
|---|---|
| di(neopentyl glycol)adipate | 700 g |
| 4,9-dioxadodecane-1,12-diamine | 5.50 g |
| tetrahydrofurfurylamine | 5.45 g |

Over a period of 30 minutes 9.06 g of hexamethylene diisocyanate were added to this mixture with stirring and under an atmosphere of nitrogen, the temperature of the reaction mixture rising from 25° to 32° C., after which stirring was continued for 30 minutes.

Subsequently, there were successively added:

| | |
|---|---|
| hexamethoxymethyl melamine | 300 g |
| propylene glycol monomethylether | 84 g |
| water | 168 g |
| 20%-solution in isopropanol of paratoluene sulphonic acid, neutralized with diethanolamine | 25 g |

The two baking paints were applied and tested as indicated in Example 1. The baking paint 5a already displayed sagging at a coating thickness of 20 μm, the greatest thickness being 25 μm. The baking paint 5b only started showing sagging at 60 μm, the greatest coating thickness being 70 μm.

EXAMPLE 6

(a) Preparation of a sag control agent

To 1 mole of furfurylamine in 500 ml of acetone there were added dropwise and under an atmosphere of nitrogen 0,5 moles of hexamethylene diisocyanate, the temperature of the reaction vessel being kept at 50° C. by cooling. After all of the hexamethylene diisocyanate had been added, heating was continued for 15 minutes with refluxing. After the product obtained had been cooled, it was filtered off and dried in vacuo. The product is a semicrystalline compound having a melting point of 198° C.

(b) Preparation of a thixotropic composition 700 g of di(neopentyl glycol)adipate were mixed with 40 g of the product obtained under (a) and heated, with stirring, to 165° C. in an atmosphere of nitrogen. At this temperature the mixture became homogeneous and clear. After cooling a thixotropic polyester was obtained. Subsequently, the following components were successively added:

| | |
|---|---|
| hexamethoxymethyl melamine | 300 g |
| propylene glycol monomethyl ether | 140 g |
| water | 230 g |
| 20%-solution in isopropanol of paratoluene sulphonic acid, neutralized with diethanolamine | 25 g |

The sprayable composition had a viscosity of 0.1 Pa.s (30 second's efflux time)

The thixotropic composition prepared was applied and tested as indicated in Example 1. The composition only started showing sagging at a coating thickness of the film of 50 μm, the greatest coating thickness being 70 μm.

EXAMPLE 7

To 2000 grammes of a conventional alkyd melamine car paint based on the solvent combination xylene/ethylglycol acetate (ratio 1:1) and a solids content of 50% there were added 12.4 grammes of p-methoxybenzylamine. Subsequently, there were added dropwise, with stirring, 7.6 grammes of hexamethylene diisocyanate. After all of the hexamethylene diisocyanate had been added, stirring was continued for 30 minutes. A thixotropic baking paint was obtained.

EXAMPLE 8

(a) Preparation of a thixotropic curing agent

To 105.5 g of furfurylamine in 800 g of hexamethoxymethyl melamine there were added dropwise and under nitrogen 94.5 g of a mixture of 2,4-toluene diisocyanate and 2,6-toluene diisocyanate (in a weight ratio of 80:20), the reaction vessel being cooled to keep the temperature of the contents thereof at about 50° C. After all of the toluene diisocyanate had been added, stirring was continued for another 15 minutes at 50° C. After the mixture had been cooled, a strongly thixotropic curing agent was obtained.

(b) Preparation of a water-dilutable, sprayable, thixotropic baking paint with a metallic appearance The following components were homogeneously mixed:

| | |
|---|---|
| 65% solution of the water-dilutable polyester A in a mixture of propylene glycol monomethyl ether and water (ratio 1:5) | 210 g |
| thixotropic melamine curing agent (prepared as indicated under a) | 40 g |
| aluminium paste (available under the trade mark Sparkle 5000 AR of Silberline | 50 g |
| propylene glycol monomethyl ether | 40 g |
| water | 680 g |

After each addition the mixture was homogenized. After addition of the aluminium paste the mixture was stirred for 30 minutes. The sprayable composition had a viscosity of about 0.1 Pa.s (30 seconds' efflux time).

(c) In a comparative experiment the following mixture was used:

| | |
|---|---|
| 65%-solution of the water dilutable polyester A in a mixture of propylene glycol monomethyl ether and water (ratio 1:5) | 210 g |
| hexamethoxymethyl melamine | 32 g |
| aluminium paste (available under the trade mark Sparkle 5000 AR of Silberline | 31 g |
| propylene glycol monomethylether | 43 g |
| water | 682 g |

After each addition the mixture was homogenized. After aluminium paste had been added, the mixture was stirred for 30 minutes. The sprayable composition had a viscosity of about 0.1 Pa.s (30 seconds' efflux time). After application to steel panels (Bonder 101) by spraying and baking these panels for 30 minutes at a temperature of 140° C. the thixotropic paint displayed an excellent metallic appearance without any irregularities, whereas the control panel just had a grey appearance with little metallic effect.

EXAMPLE 9

(a) Preparation in an organic solvent of a clear baking paint having a high solids content The following components were homogeneously mixed:

| | |
|---|---|
| di(neopentyl glycol)adipate | 700 g |
| hexamethoxymethyl melamine | 300 g |
| o-xylene | 125 g |
| ethyl glycol acetate | 125 g |
| 20%-solution in isopropanol of paratoluene sulphonic acid, neutralized with diethanolamine | 25 g |

The sprayable composition had a viscosity of about 0.1 Pa.s (30 seconds' efflux time).

(b) Preparation in an organic solvent of a thixotropic, clear baking paint having a high solids content The following components were homogeneously mixed:

| | |
|---|---|
| di(neopentyl glycol)adipate | 700 g |
| o-xylene | 220 g |
| ethyl glycol acetate | 220 g |
| p-methoxybenzylamine | 12.24 g |

Over a period of 30 minutes 7,76 g of toluene diisocyanate were added, with stirring and in an atmosphere of nitrogen, the temperature of the reaction mixture rising from 25° to 34° C., followed by 30 more minutes' stirring. Subsequently, 300 g of hexamethoxymethyl melamine were added. The sprayable composition had a viscosity of about 0.1 Pa.s (30 seconds' efflux time).

The two baking paints were applied and tested as indicated in Example 1. The baking paint 9a already showed sagging at a coating thickness of the film of 15 μm, the greatest coating thickness being 25 μm. The baking paint 9b only started showing sagging at a thickness of 60 μm, the greatest coating thickness being 75 μm.

EXAMPLE 10

Example 6b was repeated, except that use was made of 135 g of xylene and 135 g of ethyl glycol acetate instead of 230 g of water. The baking paint was applied and tested as indicated in Example 1. The baking paint only started showing sagging at a coating thickness of 55 μm, the greatest coating thickness being 75 μm. The sprayable composition had a viscosity of about 0.1 Pa.s (30 seconds' efflux time).

I claim:

1. A thixotropic coating composition comprising (1) a binder and (2) 0.1 to 30 percent by weight of solid particles of a diurea sag control agent, having a particle size of from 0.01 to 50 microns, which is the reaction product of (a) a symmetrical aliphatic or homocyclic diisocyanate and (b) a monoamine or diamine containing at least a primary amino group and an ether group.

2. The coating composition of claim 1, wherein the diisocyanate contains 3–24 carbon atoms.

3. The coating composition of claim 1, wherein the diisocyanate contains 6–9 carbon atoms.

4. A process for applying a coating composition to a substrate, characterized in that use is made of a coating composition comprising (1) a binder and (2) 0.1 to 30 percent by weight of solid particles of a diurea sag control agent, having a particle size of from 0.01 to 50 microns, which is the reaction product of (a) a symmetrical aliphatic or homocyclic diisocyanate and (b) a monoamine or diamine containing at least a primary amino group and an ether group.

5. A coated substrate obtained by the process according to claim 4.

6. A coated substrate comprising a substrate which has been coated with the composition of claim 1.

* * * * *

UNITED STATES PATENT AND TRADEMARK OFFICE
CERTIFICATE OF CORRECTION

PATENT NO. : 4,851,294

DATED : July 25, 1989

INVENTOR(S) : R. Buter et al.

It is certified that error appears in the above-identified patent and that said Letters Patent is hereby corrected as shown below:

Column 3, line 53, change "0.5" to --1.5--.

Column 4, line 14, change "99,9%" to --99.9%--.

Column 6, line 10, change "grammes" to --grams--.

Column 8, line 11, change "9,3" to --9.3--.

Column 8, line 11, change "grammes" to --grams--.

Column 9, line 6, change "0,5" to --0.5--.

Column 9, line 39, change "grammes" to --grams--.

Column 10, line 62, change "7,76" to --7.76--.

Signed and Sealed this

Fifth Day of June, 1990

Attest:

HARRY F. MANBECK, JR.

Attesting Officer

Commissioner of Patents and Trademarks